Patented Nov. 11, 1947

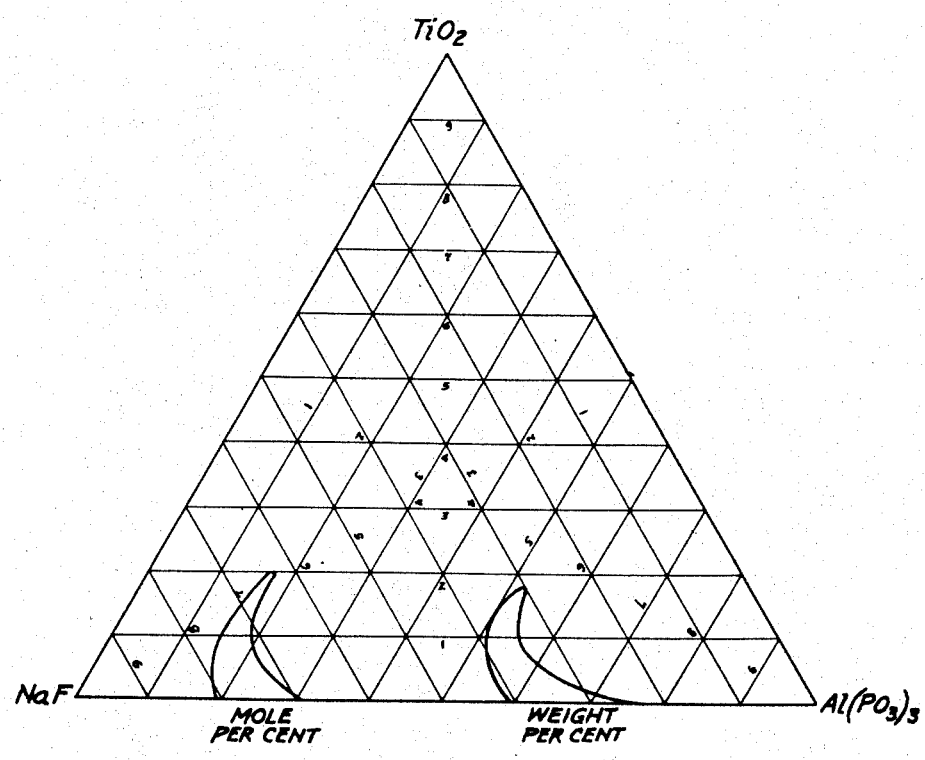

2,430,539

UNITED STATES PATENT OFFICE 2,430,539

TITANIUM FLUOPHOSPHATE GLASS

Kuan-Han Sun, Rochester, N. Y., assignor to Eastman Kodak Company, Rochester, N. Y., a corporation of New Jersey Application August 9, 1946, Serial No. 689,529

7 Claims. (Cl. 106—47)

This invention relates to fluophosphate optical glass containing titanium. Such glasses are chemically durable and with certain proportions of ingredients may be classified as flint glasses in the range of Abbe values between 30 and 60, having an index of refraction lower than those of the ordinary commercial glasses, and very high blue partial dispersion ratios. Or, if only a small amount of titanium is used, crown glasses with Abbe value between 45 and 73 and unusually high blue dispersion ratios are obtainable.

Although the general system of these glasses may be expressed in various ways, the most convenient form may be written as

$$AF-TiO_2-M(PO_y)_2$$

in which AF represents a fluoride, preferably of an alkali metal (lithium, sodium or potassium), and $M(PO_y)_2$ represent phosphate of aluminum or beryllium, usually the meta- or ortho-phosphates. As is usual in glass-making the ingredients may be introduced in forms other than those to which they are transformed in the batch. It is understood that the glass is presumably a conglomerate in which the various cations and anions are variously associated.

Usually aluminum metaphosphate, $Al(PO_3)_3$ is used as it is easily available. By blending it with aluminum oxide and aluminum orthophosphate, $AlPO_4$, any ratio of aluminum to phosphorus higher than that in the metaphosphate may be obtained. Alternatively aluminum and phosphorous oxides in varying proportions may be used.

The ternary diagram on the accompanying drawing shows the glass-forming region both in weight and mole percent of a system comprising sodium fluoride, titanium oxide and aluminum metaphosphate. The glass formation regions vary with the experimental conditions and the lines cannot be precisely drawn as of general application.

This is the equivalent of a four-component system $NaF-TiO_2-AlO_{1.5}-PO_{2.5}$, but this cannot be represented in a ternary diagram.

In the following table are given several examples with both the weight and mole percentages and also the index of refraction for the D line, the Abbe value, the blue partial dispersion ratio, and the F/P ratio.

| Example | 1 | | 2 | | 3 | | 4 | | 5 | |
|---|---|---|---|---|---|---|---|---|---|---|
| | W | M | W | M | W | M | W | M | W | M |
| NaF | 38 | 77.0 | 34 | 72.8 | 40 | 75.1 | 36 | 70.7 | 30 | 62.9 |
| TiO$_2$ | 4 | 4.3 | 6 | 6.8 | 10 | 9.9 | 13 | 13.4 | 18 | 19.8 |
| Al(PO$_3$)$_3$ | 58 | 18.7 | 60 | 20.4 | 50 | 15.0 | 51 | 15.9 | 52 | 17.3 |
| $n_D$ | 1.4820 | | 1.5092 | | 1.5142 | | 1.5490 | | 1.6084 | |
| $\nu$ | 53.1 | | 47.1 | | 40.1 | | 35.1 | | 30.2 | |
| $\nu_gF$ | 0.571 | | | | 0.598 | | 0.609 | | | |
| F/P | 1.38 | | 1.12 | | 1.68 | | 1.48 | | 1.21 | |

The following example illustrates the use of aluminum orthophosphate:

| | Example 6 | |
|---|---|---|
| | W | M |
| NaF | 32 | 57.2 |
| TiO$_2$ | 3 | 2.8 |
| AlPO$_4$ | 65 | 40.0 |
| $n_D$ | 1.4951 | |
| $\nu$ | 65.0 | |
| F/P | 1.43 | |

The following is an example in which potassium fluoride is used:

| | Example 7 | |
|---|---|---|
| | W | M |
| KF | 38 | 65.8 |
| TiO$_2$ | 12 | 15.1 |
| Al(PO$_3$)$_3$ | 50 | 19.1 |

Although only ternary compositions are given, many components may be introduced. Aluminum and beryllium may be interchanged "atomically." The addition of small amounts of compatible components also helps to prevent devitrification and to increase resistance against moisture attack.

It is further to be noted that although the examples given yield a flint glass, if a small amount of titanium oxide is included in the fluophosphate glasses given in application Serial No. 644,178, by Maurice L. Huggins and myself, or Serial No. 644,179 by myself, both filed on January 29, 1946, or, if only a very small amount of titanium is present in the glasses described above, the resulting glass is the equivalent of a crown glass having an unusually high blue partial dispersion ratio.

Glasses No. 1 and 6 are typical examples. Other examples are given in the following table:

| | Example 8 | | Example 9 | |
|---|---|---|---|---|
| | W | M | W | M |
| NaF | 30 | 55.5 | 32 | 74.7 |
| TiO$_2$ | Trace | | Trace | |
| AlPO$_4$ | 70 | 44.5 | | |
| Al(PO$_3$)$_3$ | | | 68 | 25.3 |
| $n_D$ | 1.4808 | | 1.4765 | |
| $\nu$ | 70.7 | | 70.8 | |
| $\nu_gF$ | | | 0.536 | |
| F/P | 1.24 | | 0.99 | |

In general a few percent of titanium oxide substituted in the batches described in the above-mentioned applications for a part of the fluorides or oxides there given yields a crown glass with blue partial dispersion ratios (e. g. $\nu_{gF}$) higher by 0.017 to 0.022 than those usual in glasses of the same Abbe value. It is clear that fluorine and titanium in combined form in glass contributed highly to this result.

In making these glasses, as which all batches yielding glasses containing fluorine, ingredients which give off water vapor or other gases during heating should not be used because the gaseous substances during vaporization carry fluorine away. The powdered and dried materials are mixed thoroughly and placed in a platinum vessel, which should be kept well covered to minimize volatilization. Melting is done at about 1000° C. Control of volatilization is important because glass can be formed in these systems, even if the fluorine is driven off, usually in fluoride form. In general, for a 50-gram melt, a fluid and clear liquid results after about 25 minutes. Longer heating is required for larger batches. Higher temperatures such as 1200° C. may be used for initial heating only. As soon as the batch is liquid, the temperatures may be lowered somewhat and the glass is stirred or shaken to uniformity and poured into a mold previously heated to about 350-450° C. A clear glass durable against moisture is obtained, which is colorless if pure materials are used and oxidizing conditions are attained. In general, glasses with a high titania content are more durable than those with high alkali fluoride content.

Having thus described my invention, I claim:

1. A fluophosphate optical glass containing titanium.

2. A fluophosphate optical glass resulting from a batch containing fluoride in an amount greater than 30 mole percent of the batch and containing titanium.

3. A fluophosphate optical glass resulting from a batch containing fluoride in an amount greater than 30 mole percent of the batch and containing at least two mole percent of titanium oxide.

4. An optical glass resulting from a batch containing the system $AF-TiO_2-M(PO_y)_z$, where $AF$ represents fluoride or fluorides, and $M(PO_y)_z$ represents a phosphate of beryllium or phosphate or a mixture of them.

5. An optical glass resulting from a batch containing alkali fluoride, over 50 mole percent; titanium oxide; and phosphate represented by the formula $M(PO_y)_z$ where M is beryllium or phosphorus or a mixture thereof, the phosphate being present in an amount greater than 15 mole percent.

6. An optical glass resulting from a batch containing an alkali fluoride, over 50 mole percent; titanium oxide, over 2 mole percent; and phosphate represented by the formula $M(PO_y)_z$ where M is beryllium or phosphorus or a mixture thereof, the phosphate being present in an amount greater than 15 mole percent.

7. A fluophosphate optical glass of the system $AF-TiO_2-AlO_{1.5}-PO_{2.5}$, where $AF$ represents an alkali metal fluoride.

KUAN-HAN SUN.

Disclaimer 2,430,539.—*Kuan-Han Sun*, Rochester, N. Y. TITANIUM FLUOPHOSPHATE GLASS. Patent dated Nov. 11, 1947. Disclaimer filed Sept. 17, 1949, by the assignee, *Eastman Kodak Company*.

Hereby enters this disclaimer to claims 4, 5, and 6 of said patent.

[*Official Gazette October 25, 1949.*]